(12) United States Patent
Kühnlein et al.

(10) Patent No.: US 10,639,830 B2
(45) Date of Patent: May 5, 2020

(54) TEMPLE FOR A PAIR OF GLASSES

(71) Applicant: UVEX ARBEITSSCHUTZ GMBH, Fürth (DE)

(72) Inventors: Florian Kühnlein, Fürth (DE); Markus Wiegler, Nürnberg (DE)

(73) Assignee: UVEX ARBEITSSCHUTZ GMBH, Fürth (DE)

( * ) Notice: Subject to any disclaimer, the term of this patent is extended or adjusted under 35 U.S.C. 154(b) by 0 days.

(21) Appl. No.: 16/061,751

(22) PCT Filed: Dec. 5, 2016

(86) PCT No.: PCT/EP2016/079713
§ 371 (c)(1),
(2) Date: Jun. 13, 2018

(87) PCT Pub. No.: WO2017/102398
PCT Pub. Date: Jun. 22, 2017

(65) Prior Publication Data
US 2018/0361636 A1   Dec. 20, 2018

(30) Foreign Application Priority Data
Dec. 17, 2015  (DE) .................. 10 2015 225 775

(51) Int. Cl.
*B29C 45/00*  (2006.01)
*B29D 12/02*  (2006.01)
(Continued)

(52) U.S. Cl.
CPC .......... *B29C 45/0017* (2013.01); *B29D 12/02* (2013.01); *G02C 5/146* (2013.01);
(Continued)

(58) Field of Classification Search
CPC ...... B29C 45/0017; B29D 12/02; G02C 5/20; G02C 5/2263; G02C 5/146; G02C 2200/18
See application file for complete search history.

(56) References Cited

U.S. PATENT DOCUMENTS 7,175,270 B2   2/2007   Curci et al.
7,543,932 B1   6/2009   Isabelle et al.
(Continued)

FOREIGN PATENT DOCUMENTS

DE   3727861 C1   6/1988
DE   69815241 T2  4/2004

*Primary Examiner* — Jack Dinh
(74) *Attorney, Agent, or Firm* — Browdy and Neimark, PLLC (57) ABSTRACT

A method for production of an eyeglass temple, the method including an injection of a first material into an injection molding tool upon forming an eyeglass temple main part with a main body and an inclination bearing body, and an injection of a second material into an eyeglass temple adjustment part cavity of the injection molding tool upon overmolding at least partly the inclination bearing body to form an eyeglass temple adjustment part, which is penetrated by the inclination bearing body and pivotable in relation thereto, after the first material has cured at least partly, and a removal of the eyeglass temple, which is in an eyeglass temple injection molding position, from the injection molding tool when the first material and the second material have cured at least partly.

12 Claims, 5 Drawing Sheets

(51) Int. Cl.
*G02C 5/14* (2006.01)
*G02C 5/20* (2006.01)
*G02C 5/22* (2006.01)

(52) U.S. Cl.
CPC ............ *G02C 5/20* (2013.01); *G02C 5/2263* (2013.01); *G02C 2200/18* (2013.01)

(56) References Cited

U.S. PATENT DOCUMENTS 9,188,795 B1 11/2015 Chin
2011/0157542 A1 6/2011 Tsai

TEMPLE FOR A PAIR OF GLASSES

CROSS-REFERENCES TO RELATED APPLICATIONS

This application claims the priority of German Patent Application, Serial No. 10 2015 225 775.4, filed Dec. 17, 2015, pursuant to 35 U.S.C. 119(a)-(d), the content of which is incorporated herein by reference in its entirety as if fully set forth herein.

FIELD OF THE INVENTION

The invention relates to a method for the production of temple for a pair of glasses. The invention further relates to a temple for a pair of glasses.

BACKGROUND OF THE INVENTION

Eyeglass temples are generally known from prior art. These are components of a pair of glasses and ensure a secure tight fit of the glasses on an eyeglass wearer's head.

Eyeglass temples with an inclination adjustment are also known in particular through prior public use to adjust the angle between an eyeglass wearer's line of vision and the lens surface of the eyeglasses to the respective eyeglass wearer. Eyeglass temples of this type are usually elaborate to produce. Furthermore, they are often unable to withstand high mechanical loads.

A hinge for connecting the shaft of a temple to a hinge piece of a pair of glasses and a method for producing a hinge of this type is known from DE 37 27 861 C1. The shaft of the temple is pivotable about a hinge axis. It is inherently rigid. A pair of glasses comprising a shaft of this type is not optimally adjustable to the eyeglass wearer, with the result that the required or desired visual comfort is often not achieved.

DE 698 15 241 T2 discloses a method for producing a hinge arrangement for a pair of sunglasses.

A multi-shot injection-molding process for producing eyeglass hinge connections is known from U.S. Pat. No. 7,175,270 B2. Eyeglasses with eyeglass hinge connections of this type are not optimally adjustable to the eyeglass wearer either so the visual comfort is often not achieved here either.

SUMMARY OF THE INVENTION

The invention is therefore based on an object of providing a method for producing an eyeglass temple, which allows a cost-effective and user-friendly eyeglass temple to be produced. Another object of the invention is to provide a corresponding eyeglass temple.

This object is achieved in accordance with the invention by a method for production of an eyeglass temple, the method comprising the steps of
injecting a first material into an injection molding tool upon forming an eyeglass temple main part with a main body and an inclination bearing body;
injecting a second material into an eyeglass temple adjustment part cavity of the injection molding tool upon overmolding at least partly the inclination bearing body to form an eyeglass temple adjustment part, which is penetrated by the inclination bearing body and is pivotable in relation thereto, after the first material has cured at least partly; and
removing the eyeglass temple, which is in an eyeglass temple injection molding position, from the injection molding tool when the first material and the second material have cured at least partly;
wherein the eyeglass temple main part and the eyeglass temple adjustment part are pivotable about the inclination bearing body through at least 2° in the eyeglass temple operating position,
wherein an eyeglass temple pivoting and latching arrangement is provided, which allows the eyeglass temple adjustment part and the eyeglass temple main part to be pivoted relative to one another about the inclination bearing body in a latching manner,
wherein the eyeglass temple pivoting and latching arrangement has a first latching device on the eyeglass temple main part, the first latching device extending about an inclination bearing axis of the inclination bearing body at least partly,
wherein the eyeglass temple pivoting and latching arrangement has a second latching device on the eyeglass temple adjustment part,
wherein the eyeglass temple main part and the eyeglass temple adjustment part are connected to one another non-detachably, comprising
pivoting the eyeglass temple main part and the eyeglass temple adjustment part about the inclination bearing body relative to one another to move the eyeglass temple from the eyeglass temple injection molding position into the eyeglass temple operating position,
wherein the first latching device and the second latching device are disengaged from one another in the eyeglass temple injection molding position.

The object of the invention is further achieved by an eyeglass temple, in particular produced according to a method according to the invention,
a) with an eyeglass temple main part, which comprises an inclination bearing body,
b) with an eyeglass temple adjustment part,
  i) wherein the eyeglass temple main part and the eyeglass temple adjustment part are pivotable relative to one another,
  ii) wherein the eyeglass temple main part and the eyeglass temple adjustment part are connected to one another non-detachably,
  iii) wherein the eyeglass temple main part and the eyeglass temple adjustment part are pivotable about the inclination bearing body over at least 2° in an eyeglass temple operating position, and
c) with an eyeglass temple pivoting and latching arrangement, which allows the eyeglass temple adjustment part and the eyeglass temple main part to be pivoted relative to one another about the inclination bearing body in a latching manner,
  i) wherein the eyeglass temple pivoting latching arrangement has a first latching on the eyeglass temple main part, the first latching device extending about an inclination bearing axis of the inclination bearing body at least partly,
  ii) wherein the eyeglass temple pivoting latching arrangement has a second latching device on the eyeglass temple adjustment part,
  iii) wherein the first latching device and the second latching device (28) are disengaged from one another in the eyeglass temple injection molding position.

The gist is that the eyeglass temple, which comprises an eyeglass temple main part and an eyeglass temple adjustment part, is produced in precisely one injection molding tool, wherein these parts are already connected, in particular hinged, to each other in particular non-detachably, advantageously directly, upon completion of the injection molding process. Complex assembly processes to connect the eyeglass temple main part to the eyeglass temple adjustment part can therefore be omitted.

The eyeglass temple allows an inclination adjustment to adjust the angle between an eyeglass wearer's line of vision and a lens surface of a pair of glasses to the respective eyeglass wearer. Advantageously, the inclination bearing body is part of an inclination hinge of the eyeglass temple.

By the pivoting movement between the eyeglass temple main part and the eyeglass temple adjustment part, the eyeglass temple operating position is achievable from the eyeglass temple injection molding position. In the eyeglass temple operating position, the eyeglass temple is completely finished and ready for use as an eyeglass component. Conventional screwing, plugging or latching processes to connect the eyeglass temple main part and the eyeglass temple adjustment part with each other can therefore be omitted. The relative pivoting movement between the eyeglass temple main part and the eyeglass temple adjustment part to reach the eyeglass temple operating position is carried out preferably manually or in an automated manner.

It is advantageous if there is an angular distance about the inclination bearing axis of at least 20°, more preferably of at least 30°, between the eyeglass temple operating position and the eyeglass temple injection molding position. Advantageously, the angular range is smaller than 90°, more preferably smaller than 70°.

In the eyeglass temple operating position, the eyeglass temple main part and the eyeglass temple adjustment part are pivotable relative to one another over at least 2°, more preferably at least 5°, about the inclination bearing body. They are pivotable between two inclination end positions.

An eyeglass temple with an eyeglass temple pivoting and latching arrangement for pivoting the eyeglass temple adjustment part and the eyeglass temple main part relative to one another about the inclination bearing boy in a latching manner is particularly user-friendly. The inclination of the at least one lens of the pair of glasses is thus extremely well adjustable. The eyeglass temple pivoting latching arrangement advantageously defines a plurality of stable latching positions.

Advantageously, the first latching device has at least one first latching tooth. If more than one first latching teeth are provided, they are advantageously arranged in succession.

Advantageously, the second latching device has at least one second latching tooth. If more than one second latching teeth are provided, they are advantageously arranged in succession.

The first latching device and the second latching device are disengaged from one another in the eyeglass temple injection molding position. The eyeglass temple pivoting latching arrangement is then non-operational, in other words ineffective. Advantageously, the latching devices are then pivoted relative to one another, in other words they are arranged in succession relative to the first and second latching teeth.

Advantageously, the two materials used to produce the eyeglass temple are injected into the injection molding tool consecutively.

It is expedient if the eyeglass temple main part is dimensionally stable at least partly before the second material is being injected into the injection molding tool. Advantageously, the first material has then already cured or solidified completely.

Advantageously, the eyeglass temple adjustment part is dimensionally stable at least partly before it is removed from the injection molding tool. Advantageously, the second material has then already cured completely.

Removing the eyeglass temple, which includes the eyeglass temple main part and the eyeglass temple adjustment part connected thereto, from the injection molding tool is carried out preferably manually or in an automated manner.

The eyeglass temple production method is advantageously a two-component assembly injection molding process. Advantageously, an adhesive bond between the first material and the second material is produced neither in the injection molding tool nor afterwards.

It is advantageous if the eyeglass temple main part and the eyeglass temple adjustment part are injection-molded in such a way that they are hinged to one another immediately after production.

It is advantageous if the inclination bearing body is configured in the manner of a pin or a journal. It is expedient if the inclination bearing body is cylindrical at least in an inclination bearing area. Advantageously, the eyeglass temple adjustment part surrounds the inclination bearing body over its circumference or inclination bearing area completely. It is advantageous if the inclination bearing body defines a pivot axis for pivoting the eyeglass temple adjustment part relative to the eyeglass temple main part.

It is expedient if the injection molding tool comprises at least two tool parts. Advantageously, these are movable relative to one another. It is advantageous if each tool part is heatable at least in regions. Advantageously, the injection molding tool has at least one first injection channel to inject the first material into an eyeglass temple main part cavity of the injection molding tool and at least one second injection channel to inject the second material into an eyeglass temple adjustment part cavity of the injection molding tool.

It is expedient if the eyeglass temple consists of the eyeglass temple main part and of the eyeglass temple adjustment part. Advantageously, the eyeglass temple therefore consists of two main parts. Preferably, the eyeglass temple main part is formed in one piece. The eyeglass temple main part may, for example, also comprise at least one component, in particular another component, injection-molded thereto. The eyeglass temple adjustment part is preferably formed in one piece. The eyeglass temple adjustment part may, for example, also comprise at least one component, in particular a soft component, injection-molded thereto.

Advantageously, the eyeglass temple adjustment part rests against the outside of the respective eyeglass temple main part.

The eyeglass temple main part has preferably at least one hinge bearing body to provide a hinged connection with a lens, an eyeglass frame and/or an eyeglass frame part of a pair of glasses.

The embodiment, in which the eyeglass temple adjustment part cavity for the second material is created in the injection molding tool after the injection of the first material into the injection molding tool (36) and prior to the injection of the second material into the injection molding tool, is extremely easy and economical to produce. Advantageously, the eyeglass temple adjustment part cavity in the injection molding tool is creatable by means of at least one injection molding tool rotary table and/or a displaceable injection molding tool slider.

The first material and the second material are different materials, in particular plastic materials. It is advantageous if the two materials used are from the group consisting of PBT (polybutylene terephthalate), POM (polyoxymetheylene), PA (polyamide) or ABS (acrylonitrile butadiene styrene).

It is advantageous if the first material has a higher melting point than the second material. This embodiment effectively prevents the first material, which is first injected into the injection molding tool, from melting at least partly when the second material is being injected into the injection molding tool afterwards. Advantageously, the melting point of the first material is much higher, i.e. preferably at least 10° C. higher, than that of the second material.

The first latching device and the second latching device engage one another, in other words they are in a latching connection, in the eyeglass temple operating position. The eyeglass temple pivoting and latching arrangement is then fully operational.

The eyeglass temple main part and the eyeglass temple adjustment part of the eyeglass temple produced by the method, in which the eyeglass temple main part comprises at least one retaining body arranged on the inclination bearing body, the retaining body reaching over the eyeglass temple adjustment part at least partly and connecting the eyeglass temple adjustment part non-detachably and in such a way as to prevent them from getting lost, respectively. Advantageously, the retaining body is configured in the manner of a disk preferably in such a way as to reach over an annular region of the eyeglass temple adjustment part adjacent to the inclination bearing body. The at least one retaining body advantageously forms a retaining head. The eyeglass temple main part therefore has an undercut in the region of the inclination bearing body.

The two inclination end positions, in which the eyeglass temple main part and the eyeglass temple adjustment part are pivotable between two inclination end positions, allow various inclinations of the at least one lens to be set.

An inclination bearing axis of the inclination bearing body, in which the eyeglass temple main part comprises at least one hinge bearing body to form a hinged connection with a lens and/or an eyeglass frame part, an inclination bearing axis of the inclination bearing body extending substantially perpendicular to a hinge bearing axis, is substantially perpendicular to a hinge bearing axis. It is preferably substantially horizontal when wearing a corresponding pair of glasses. The hinge bearing axis is preferably substantially vertical when wearing the pair of glasses.

There is a connection between the inclination bearing body and the eyeglass temple adjustment part, which is substantially without play or clearance. An annular connection line between the inclination bearing body and the eyeglass temple adjustment part preferably has a width of between 0.1 mm and 0.3 mm. It is advantageous if the at least one retaining body covers or reaches over said connection line at least partly.

BRIEF DESCRIPTION OF THE DRAWING

A preferred embodiment of the invention will hereinafter be described by way of example with reference to the attached drawing in which.

DESCRIPTION OF THE PREFERRED EMBODIMENT

Mutually corresponding parts carry the same reference numerals in FIGS. 1 to 8. Details of the exemplary embodiment explained in more detail in the following sections may constitute an invention or part of an inventive subject matter per se as well.

Figure 1:
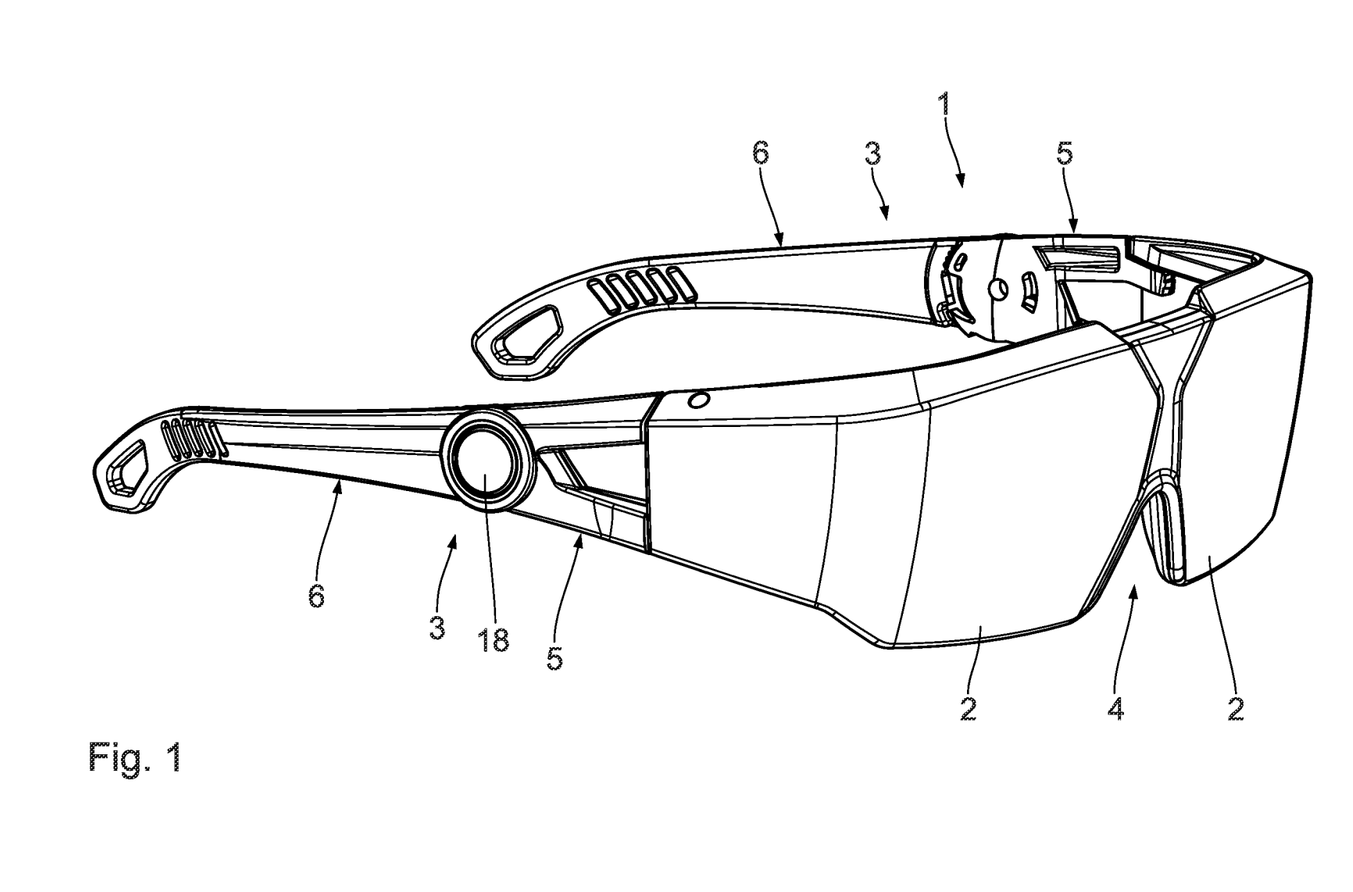
FIG. 1 shows a perspective view of a pair of glasses, which comprises two eyeglass temples according to the invention.

Referring first to FIG. 1, a pair of glasses 1 comprises two lenses 2 and two eyeglass temples 3. Between the lenses 2, there is a nose recess 4 to accommodate an eyeglass wearer's nose (not shown). The two lenses 2 are arranged adjacent to one another. Alternatively, a one-piece single lens 2 is provided. A respective one of the eyeglass temple 3 is in each case hinged to each lens 2 on the lateral outside thereof. The eyeglass temples 3 are thus pivotable relative to the lens 2. Alternatively, the eyeglass temples 3 are hinged to eyeglass frame parts of the eyeglasses 1. The eyeglasses 1 are symmetrical relative to a symmetry plane, which runs through the nose recess 4.

As the eyeglass temples 3 are mirror-symmetric but nevertheless of identical design, only one of the eyeglass temples 3 will be described in the following sections.

Each eyeglass temple 3 has an eyeglass temple main part 5 and an eyeglass temple adjustment part 6, which is arranged on the eyeglass temple main part 5 and is therefore in direct contact therewith. The eyeglass temple main part 5 and the eyeglass temple adjustment part 6 are coupled with one another and pivotable relative to one another.

Figure 2:
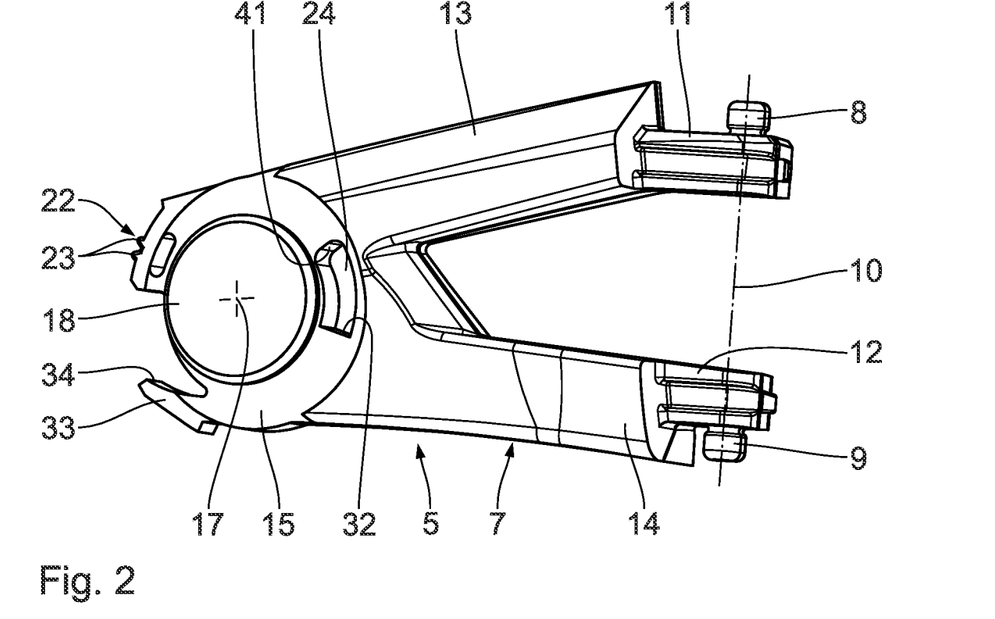
FIG. 2 shows a side view of an eyeglass temple main part of an eyeglass temple shown in FIG. 1.
Figure 3:
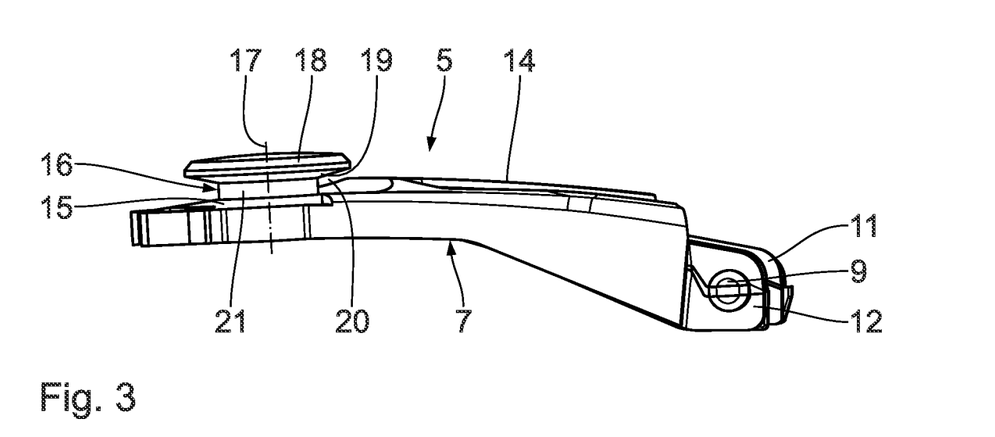
FIG. 3 shows another side view of the eyeglass temple main part, the view being rotated through 90° relative to FIG. 2.

The eyeglass temple main part 5 has a main body 7. The main body 7 carries two hinge bearing bodies 8, 9 on each of its ends, with each of them being configured in the manner of a journal and defining a common hinge bearing axis 10. Each hinge bearing body 8, 9 is arranged on a mounting protrusion 11 or 12, respectively, which in turn protrudes from a respective mounting arm 13 or 14, respectively, of the main body 7. The hinge bearing bodies 8, 9 are arranged on mounting faces of the mounting protrusions 11, 12, and facing away from each other, project away from one another and from the same. The hinge bearing bodies 8, 9 allow the eyeglass temple main part 5 to be arranged on the respective lens 2 or an eyeglass frame part of the eyeglasses 1 in a hinged manner.

The mounting arms 13, 14 are oblique to one another and are firmly connected to one another via a basis 15 of the main body 7. Alternatively, the main body 7 has only precisely one mounting arm 13, 14. Alternatively, the main body 7 carries only precisely one hinge bearing body 8, 9.

A cylindrical inclination bearing body 16 protrudes outwardly from the basis 15, the inclination bearing body 16 defining an inclination bearing axis 17 and having a circumferential inclination bearing area 21. The inclination bearing body 16 protrudes from the basis 15 in a substantially vertical direction and is rigid. It is not compressible. The inclination bearing axis 17 runs substantially perpendicular to the respective hinge bearing axis 10.

Opposite the basis 15, the inclination bearing body 16 carries a disk-like retaining head 18. The retaining head 18 protrudes outwardly relative to the inclination bearing body 16 in a radial direction relative to the inclination bearing axis 17 and is rigid. It runs spaced from the basis 15 and is not compressible.

The retaining head 18 has a retaining face 19 facing the basis 15, the retaining face 19 having a slightly conical progression. The retaining face 19 runs from the inclination bearing body 16 upwards outwards.

Between the basis 15 and the retaining face 19, there is an undercut region 20.

On the basis 15, a first latching device 22 is arranged at the side substantially opposite the upper mounting arm 13, the first latching device 22 comprising two first latching teeth 23. A different number is possible. The first latching teeth 23 are spaced from the inclination bearing axis 17. The first latching device 22 extends about the inclination bearing axis 17 arcuately in the shape of an angular range. The first latching teeth 23 protrude away from the inclination bearing axis 17.

The basis 15 is penetrated by a stop recess 24 substantially entirely. The stop recess 24 is spaced from the inclination bearing axis 17 and extends about the latter arcuately in an angular range. The inclination bearing axis latching device 22 and the stop recess 24.

The eyeglass temple main part 5 is formed in one piece. In particular, the main body 7, the inclination bearing body 16, the retaining head 18 and the first latching device 22 are connected to each other in such a way as to form one piece.

Figure 4:
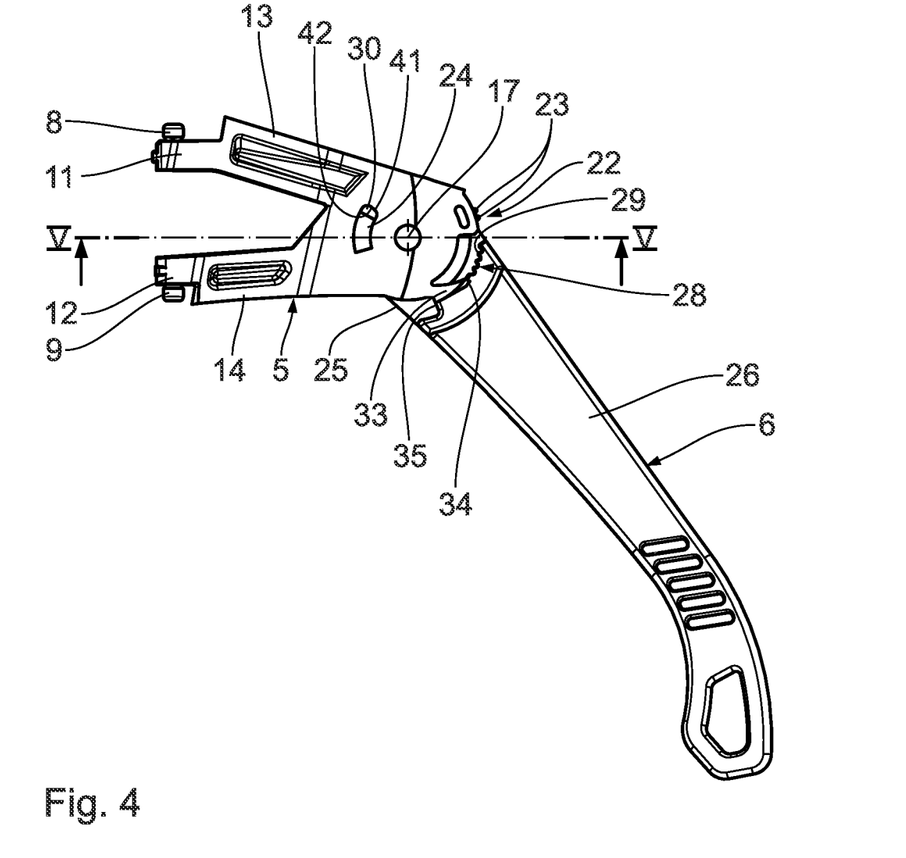
FIG. 4 shows a side view of the eyeglass temple shown in FIG. 1, the eyeglass temple being in its eyeglass temple injection molding position.

The one-piece eyeglass temple adjustment part 6 has a coupling region 25 and a temple region 26 adjoining the coupling region 25.

The coupling region 25 is adjacent to the basis 15 and is in direct contact therewith. It is in a hinged connection with the basis 15.

Figure 5:
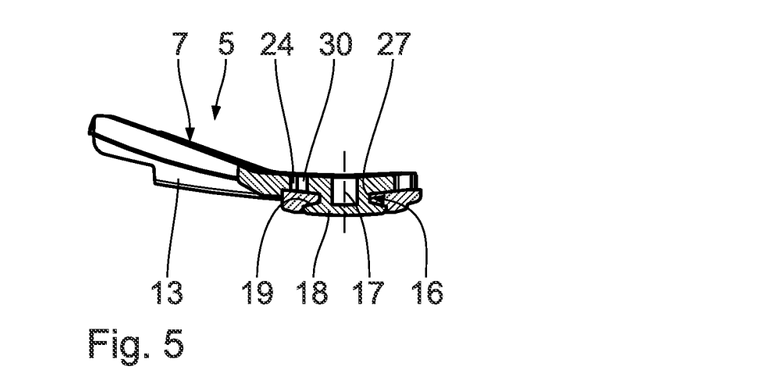
FIG. 5 shows a sectional view along section line V-V shown in FIG. 4.

In the coupling region 25, a passage inclination bearing opening 27 is formed, which is circular in cross-section and is completely closed circumferentially. The diameter of the inclination bearing opening 27 is adapted to the external diameter of the inclination bearing body 16. In particular, the diameter of the inclination bearing opening 27 is identical or substantially identical to the external diameter of the inclination bearing body 16. The coupling region 25 or the eyeglass temple adjustment part 6 surrounds the inclination bearing region 25 substantially without play or without clearance.

The coupling region 25 carries a second snap-in latching device 28 with a plurality of second latching teeth 29 arranged in succession. The second latching teeth 29 are adapted to the first latching teeth 23. They are spaced from the inclination bearing axis 17. The second latching device 28 extends arcuately about the inclination bearing axis 17 in an angular range.

The coupling region 25 further carries a stop protrusion 30, which engages the stop recess 24 from outside. The stop protrusion 30 is spaced from and parallel to the inclination bearing body 16. It has a downwardly facing stop face 31 to bear against a stop face 32 of the eyeglass temple main part 5 defining down there the stop recess 24 in a stop position.

The eyeglass temple main part 5 carries a stop projection 33 comprising a front stop face 34 to bear against a downwardly facing stop face 35 on the eyeglass temple adjustment part 6 in another stop position.

The coupling region 25 bears against the outside of the basis 15, in particular in an areal manner. The retaining head 18 reaches over the inclination bearing opening 27 uniformly and covers the annular connection line between the inclination bearing body 16 and the coupling region 26 and the eyeglass temple adjustment part 6, respectively. The retaining head 18 reaches over the connection line constantly by at least 2 mm. The retaining face 19 bears against the coupling region 25, in particular in an areal manner. In an annular region adjoining the inclination bearing opening 27, the coupling region 25 is substantially conical.

The eyeglass temple adjustment part 6 surrounds the respective inclination bearing region 21 completely and engages the respective undercut region 20 in such a way that a positive fit is obtained.

The eyeglass temple adjustment part 6 bears against the respective main body 7 and the retaining face 19 and against the inclination bearing region 21 at least partly, advantageously completely.

Figure 6:
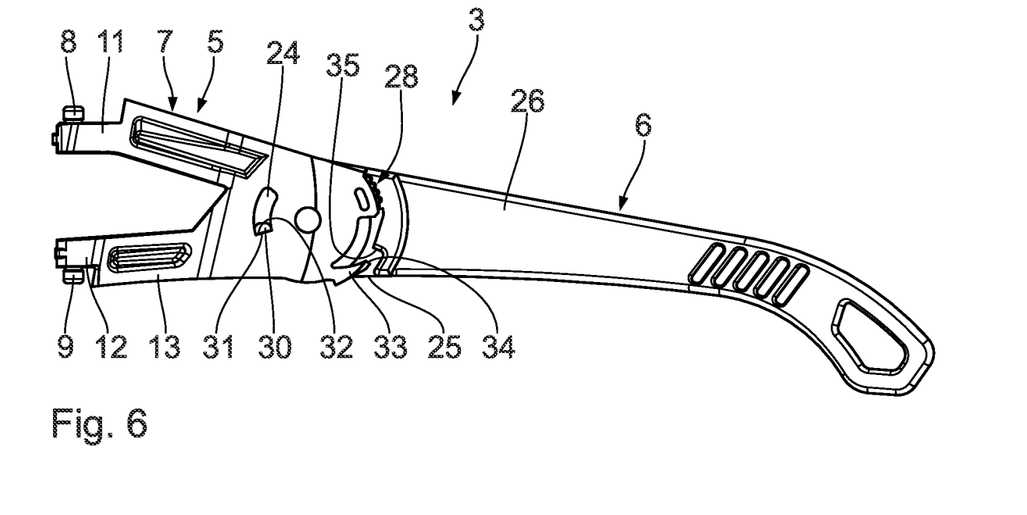
FIG. 6 shows a side view of the eyeglass temple shown in FIG. 1, the eyeglass temple being in the eyeglass temple operating position, wherein the eyeglass temple adjustment part is in a lower inclination end position.
Figure 7:
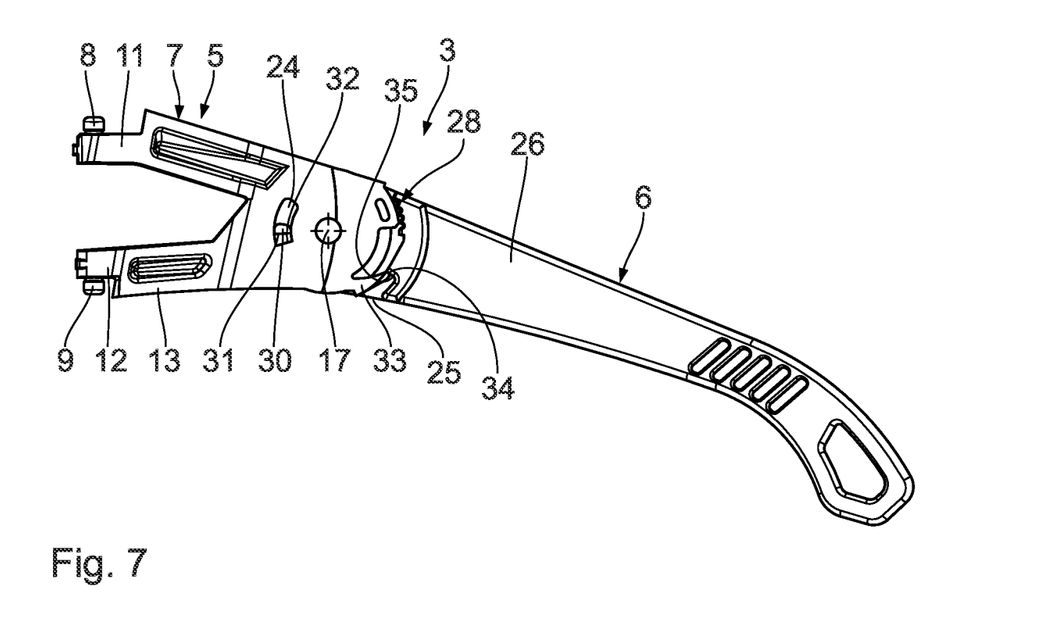
FIG. 7 shows a side view of the eyeglass temple shown in FIG. 6, the eyeglass temple adjustment part being in an upper inclination end position.

In the operating position of the respective eyeglass temple 3, the latching devices 22, 28 engage one another. By applying a corresponding displacement force to the respective eyeglass temple adjustment part 6, the eyeglass temple adjustment part 6 is pivotable about the inclination bearing axis 17 relative to the eyeglass temple main part 5 by overcoming the latching force between the latching devices 22, 28, thus allowing the inclination of the eyeglasses 1 to be changed.

The displacement path is limited. In a first end position of the eyeglass temple main part 5 and the eyeglass temple adjustment part 6 relative to one another, the stop protrusion 30 bears, with its lower stop face 31, against the inside of the stop face 32, and gests in the way of a further pivoting movement in a blocking matter (FIG. 6). The stop face 32 is arranged at the bottom of the stop recess 24 and faces upwards. On the whole, the eyeglass temple 3 then has a substantially straight progression. This position is a lower inclination end position. The stop projection 33 has no function. The latching devices 22, 28 engage one another.

In a second end position of the eyeglass temple main part 5 and the eyeglass temple adjustment part 6 relative to one another, the stop projection 33 bears, with its stop face 34, against the stop face 35 and gest in the way of a further pivoting movement in a blocking manner about the inclination bearing axis 17 (FIG. 7). The eyeglass temple 3 is inclined at the hinge. The eyeglass temple adjustment device 6 is pivoted downwards relative to the lower inclination end position. This position is an upper inclination end position. The stop protrusion 30 is arranged in the stop recess 24 such as to be spaced from the stop faces 32, 42. The latching devices 22, 28 engage one another.

In the mounted condition of the eyeglasses 1, the hinge bearing bodies 8, 9 engage into corresponding hinge bearing recesses (not shown) provided on a respective eyeglass frame part or the respective lens 2 in such a way that the eyeglass temples 3 are pivotable about the respective hinge bearing axes 10.

The method of producing an eyeglass temple 3 will be described in the following. The eyeglass temple 3 is produced in an injection molding tool 36 (FIG. 8), which comprises a first and a second tool part 37 and 38, respectively. The tool parts 37, 38 are displaceable relative to one another. In particular, they are movable relative to one another between an open position and a closed position.

Figure 8:
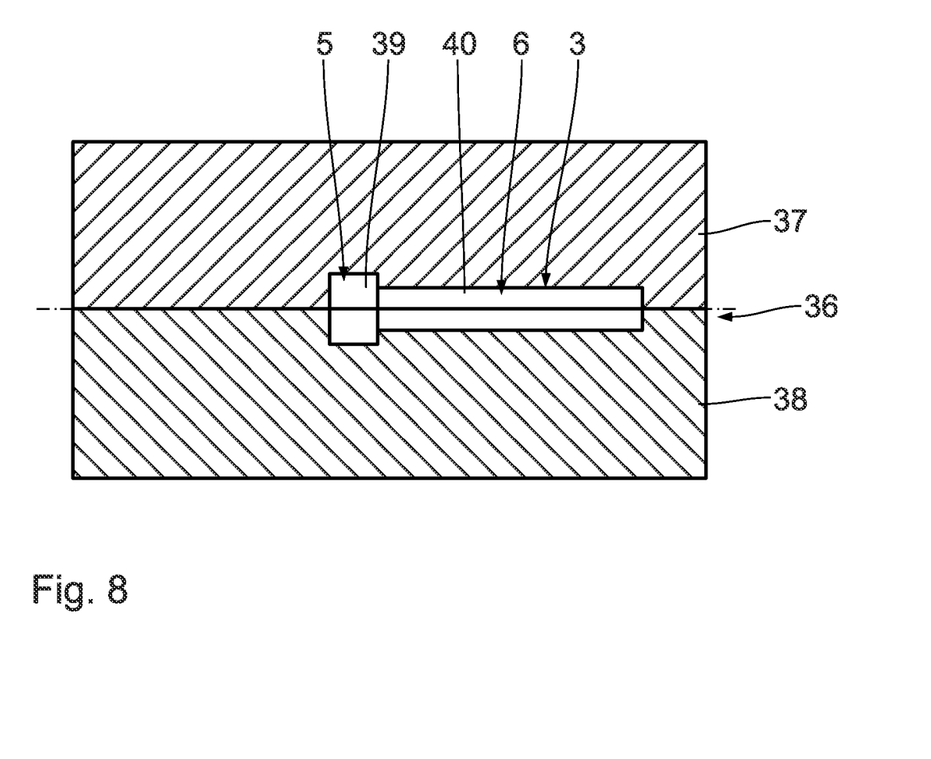
FIG. 8 shows a sectional view of a greatly simplified injection molding tool to produce the eyeglass temple according to the invention, wherein the sectional view is not to scale and is for illustration purposes only.

In order to produce the eyeglass temple main part 5, a first plastic material is injected into an eyeglass temple main part cavity 39, which is defined by the tool parts 37, 38 in a closed position of the injection molding tool 36. For this purpose, the eyeglass temple main part cavity 39 is formed or dimensioned such as to correspond to the eyeglass temple main part 5.

The injection molding tool 36 is opened after the first plastic material in the eyeglass temple main part cavity 39 has cured or during the curing of the first plastic material. The injection molding tool 36 is adjusted to produce an eyeglass temple adjustment part cavity 40.

The injection molding tool 36 is then closed, whereby the eyeglass temple adjustment part cavity 40 of the injection molding tool 36 is defined in the injection molding tool 36. The eyeglass temple adjustment part cavity 40 adjoins the eyeglass temple main part cavity 39, and the eyeglass temple main part 5, respectively, which is then formed therein, directly and is open there.

Then, in order to produce the eyeglass temple adjustment part 6, a second plastic material is injected into the eyeglass temple adjustment part cavity 40. The eyeglass temple adjustment part cavity 40 is adapted to the eyeglass temple adjustment part 6 in terms of its shape and size. The eyeglass temple adjustment part cavity 40 is positioned relative to the eyeglass temple main part cavity 39 in such a way that the eyeglass temple adjustment part 6 is arranged relative to the eyeglass temple main part 5 as set out above.

When the eyeglass temple 3 is removed from the injection molding tool 36, the eyeglass temple 3 is in an eyeglass temple injection molding position (see FIGS. 4, 5). The eyeglass temple main part 5 and the eyeglass temple adjustment part 6 are connected to one another non-detachably in a hinged manner and are inclined relative to one another. The stop protrusion 30 bears, with its upper stop face 41, against a stop face 42, defining the stop recess 24 upwards, of the eyeglass temple main part 5 and prevents a downward pivoting movement of the eyeglass temple adjustment part 6 relative to the eyeglass temple main part 5. The stop projection 33 has no function.

Upon removal from the injection molding tool 36, there is a ready-to-use hinge between the eyeglass temple main part 5 and the eyeglass temple adjustment part 6. The latching devices 22, 28 are spaced from each other and disengage each other. The latching devices 22, 28 are spaced from one another by the inclination bearing axis 17.

In order to move the eyeglass temple 3 from the eyeglass temple injection molding position into an eyeglass temple operating position, a corresponding force is applied between the eyeglass temple main part 5 and the eyeglass temple adjustment part 6. The eyeglass temple main part 5 and the eyeglass temple adjustment part 6 are pivoted relative to one another about the inclination bearing axis 17 in such a way that the latching devices 22, 28 engage one another.

The eyeglass temple main part 5 and the eyeglass temple adjustment part 6 are then in a substantially stretched position. An excess pivoting movement of the eyeglass temple main part 5 and of the eyeglass temple adjustment

The invention claimed is:
1. A method for production of an eyeglass temple, the method comprising the steps of
   injecting a first material into an injection molding tool upon forming an eyeglass temple main part with a main body and an inclination bearing body;
   injecting a second material into an eyeglass temple adjustment part cavity of the injection molding tool upon overmolding at least partly the inclination bearing body to form an eyeglass temple adjustment part, which is penetrated by the inclination bearing body and is pivotable in relation thereto, after the first material has cured at least partly; and
   removing the eyeglass temple, which is in an eyeglass temple injection molding position, from the injection molding tool when the first material and the second material have cured at least partly;
   wherein the eyeglass temple main part and the eyeglass temple adjustment part are pivotable about the inclination bearing body through at least 2° in the eyeglass temple operating position,
   wherein an eyeglass temple pivoting and latching arrangement is provided, which allows the eyeglass temple adjustment part and the eyeglass temple main part to be pivoted relative to one another about the inclination bearing body in a latching manner,
   wherein the eyeglass temple pivoting and latching arrangement has a first latching device on the eyeglass temple main part, the first latching device extending about an inclination bearing axis of the inclination bearing body at least partly,
   wherein the eyeglass temple pivoting and latching arrangement has a second latching device on the eyeglass temple adjustment part,
   wherein the eyeglass temple main part and the eyeglass temple adjustment part are connected to one another non-detachably,
   comprising
   pivoting the eyeglass temple main part and the eyeglass temple adjustment part about the inclination bearing body relative to one another to move the eyeglass temple from the eyeglass temple injection molding position into the eyeglass temple operating position,
   wherein the first latching device and the second latching device are disengaged from one another in the eyeglass temple injection molding position.

2. A method according to claim 1, wherein the eyeglass temple adjust-ment part cavity for the second material is created in the injection molding tool after the injection of the first material into the injection molding tool and prior to the injection of the second material into the injection molding tool.

3. A method according to claim 1, wherein the first material and the second material are different materials.

4. A method according to claim 3, wherein the different materials are plastic materials.

5. A method according to claim 1, wherein the first latching device and the second latching device engage one another in the eyeglass temple operating position.

6. Method according to claim 1, wherein the eyeglass temple main part comprises at least one retaining body arranged on the inclination bearing body, the retaining body reaching over the eyeglass temple adjustment part at least partly and connecting the eyeglass temple main part with the eyeglass temple adjustment part non-detachably.

7. A method according to claim 1, wherein the eyeglass temple main part and the eyeglass temple adjustment part are pivotable between two inclination end positions.

8. A method according to claim 1, wherein the eyeglass temple main part comprises at least one hinge bearing body to form a hinged connection with at least one of a lens and an eyeglass frame part, an inclination bearing axis of the inclination bearing body (16) extending substantially perpendicular to a hinge bearing axis (10).

9. An eyeglass temple,
- a) with an eyeglass temple main part, which comprises an inclination bearing body,
- b) with an eyeglass temple adjustment part,
    - i) wherein the eyeglass temple main part and the eyeglass temple adjustment part are pivotable relative to one another,
    - ii) wherein the eyeglass temple main part and the eyeglass temple adjustment part are connected to one another non-detachably,
    - iii) wherein the eyeglass temple main part and the eyeglass temple adjustment part are pivotable about the inclination bearing body over at least 2° in an eyeglass temple operating position, and
- c) with an eyeglass temple pivoting and latching arrangement, which allows the eyeglass temple adjustment part and the eyeglass temple main part to be pivoted relative to one another about the inclination bearing body in a latching manner,
    - i) wherein the eyeglass temple pivoting latching arrangement has a first latching device on the eyeglass temple main part, the first latching device extending about an inclination bearing axis of the inclination bearing body at least partly,
    - ii) wherein the eyeglass temple pivoting latching arrangement has a second latching device on the eyeglass temple adjustment part,
    - iii) wherein the first latching device and the second latching device are disengaged from one another in the eyeglass temple injection molding position.

10. An eyeglass temple according to claim 9 produced according to a method for production comprising the steps of
- injecting a first material into an injection molding tool upon forming an eyeglass temple main part with a main body and an inclination bearing body;
- injecting a second material into an eyeglass temple adjustment part cavity of the injection molding tool upon overmolding at least partly the inclination bearing body to form an eyeglass temple adjustment part, which is penetrated by the inclination bearing body and is pivotable in relation thereto, after the first material has cured at least partly; and
- removing the eyeglass temple, which is in an eyeglass temple injection molding position, from the injection molding tool when the first material and the second material have cured at least partly;
- wherein the eyeglass temple main part and the eyeglass temple adjustment part are pivotable about the inclination bearing body through at least 2° in the eyeglass temple operating position,
- wherein an eyeglass temple pivoting and latching arrangement is provided, which allows the eyeglass temple adjustment part and the eyeglass temple main part to be pivoted relative to one another about the inclination bearing body in a latching manner,
- wherein the eyeglass temple pivoting and latching arrangement has a first latching device on the eyeglass temple main part, the first latching device extending about an inclination bearing axis of the inclination bearing body at least partly,
- wherein the eyeglass temple pivoting and latching arrangement has a second latching device on the eyeglass temple adjustment part,
- wherein the eyeglass temple main part and the eyeglass temple adjustment part are connected to one another non-detachably,
- comprising
- pivoting the eyeglass temple main part and the eyeglass temple adjustment part about the inclination bearing body relative to one another to move the eyeglass temple from the eyeglass temple injection molding position into the eyeglass temple operating position,
- wherein the first latching device and the second latching device are disengaged from one another in the eyeglass temple injection molding position.

11. An eyeglass temple according to claim 9, wherein there is a connection between the inclination bearing body and the eyeglass temple adjustment part, which is substantially free of play.

12. An eyeglass temple according to claim 9, comprising at least one stop, which is active between the eyeglass temple adjustment part and the eyeglass temple main part, to limit a pivoting movement between the eyeglass temple main part and the eyeglass temple adjustment part about the inclination bearing body.

* * * * *